United States Patent [19]
Andress et al.

[11] Patent Number: 5,757,580
[45] Date of Patent: May 26, 1998

[54] CONSTRAIN LAYER DAMPING OF A DISC DRIVE PRINTED WIRING ASSEMBLY

[75] Inventors: Jeffrey D. Andress, Edmond; Kenneth L. Pottebaum, Yukon, both of Okla.

[73] Assignee: Seagate Technology, Inc., Scotts Valley, Calif.

[21] Appl. No.: 757,837

[22] Filed: Nov. 27, 1996

[51] Int. Cl.$^6$ ............................................... G11B 33/14
[52] U.S. Cl. ................................................. 360/97.02
[58] Field of Search ................................. 360/97.01, 97.02

[56] References Cited

U.S. PATENT DOCUMENTS

| | | |
|---|---|---|
| 4,491,888 | 1/1985 | Brown et al. |
| 5,140,478 | 8/1992 | Yoshida. |
| 5,214,549 | 5/1993 | Baker et al. |
| 5,235,482 | 8/1993 | Schmitz. |
| 5,282,100 | 1/1994 | Tacklind ............................ 360/97.02 |
| 5,483,397 | 1/1996 | Gifford et al. |

*Primary Examiner*—A. J. Heinz
*Attorney, Agent, or Firm*—Bill D. McCarthy; Edward P. Heller, III; Randall K. McCarthy

[57] ABSTRACT

Apparatus for reducing mechanical resonances in a disc drive printed circuit board to reduce acoustic emissions and improve mechanical shock sensing and reporting. A constrain layer comprising a thin layer of rigid, stiffening material is disposed adjacent to the exterior surface of the base portion of a base deck of the disc drive. A vibro-acoustic isolator comprising a thin layer of dampening material, is disposed adjacent the constrain layer and the printed circuit board, the vibro-acoustic isolator and the constrain layer are secured to the base portion of the base deck using conventional fasteners. The vibro-acoustic isolator serves to isolate the printed circuit board from the constrain layer and at the same time dampen mechanical resonances established in the printed circuit board, in conjunction with the stiffening provided by the constrain layer. The constrain layer and vibro-acoustic isolator thus reduce acoustic emissions generated by resonances established in the printed circuit board, as well as reducing the potential for false triggering of a shock sensor mounted to the printed circuit board and used to detect shock events encountered by the disc drive.

10 Claims, 3 Drawing Sheets

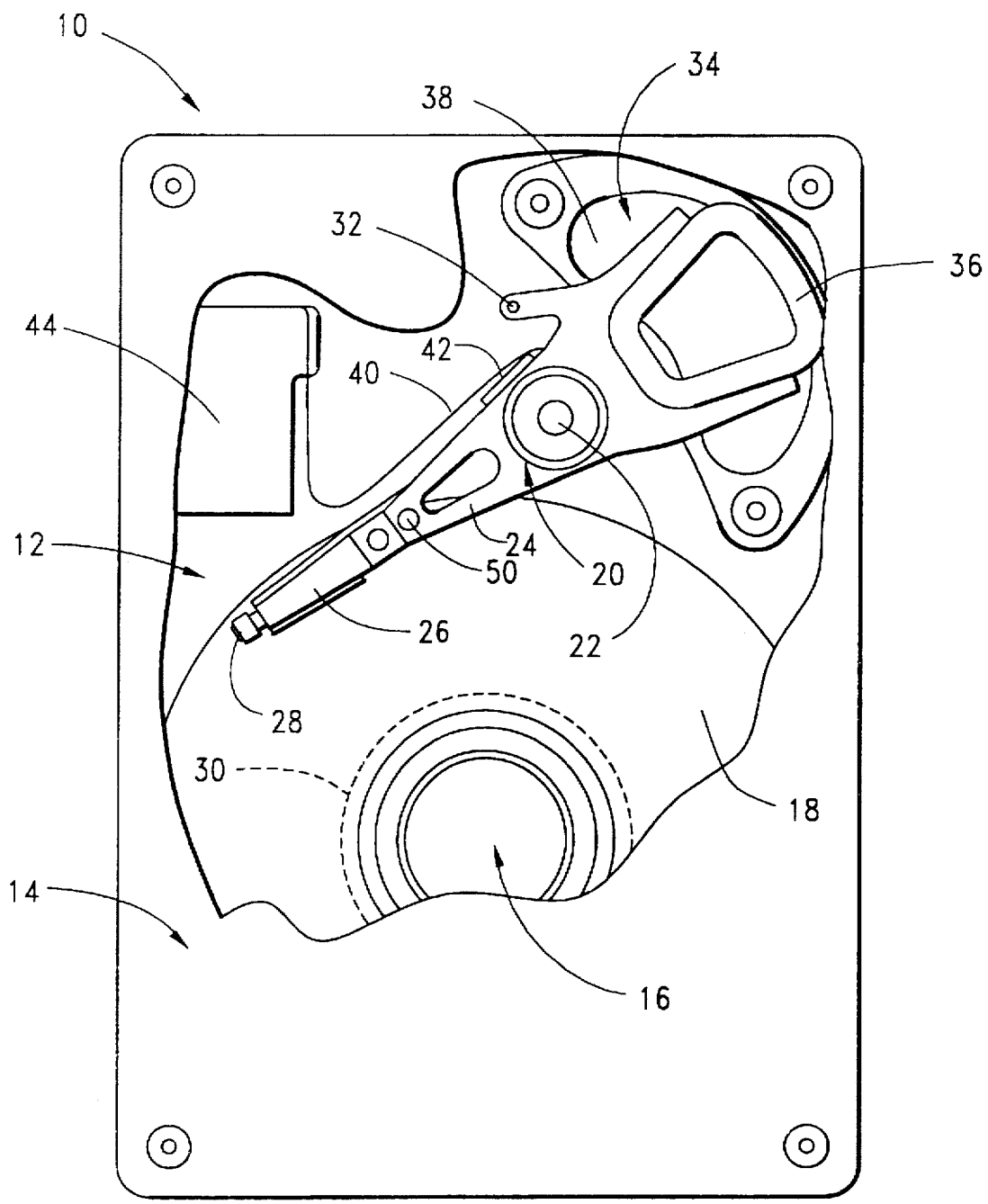
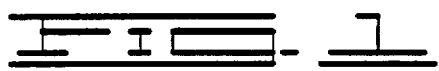

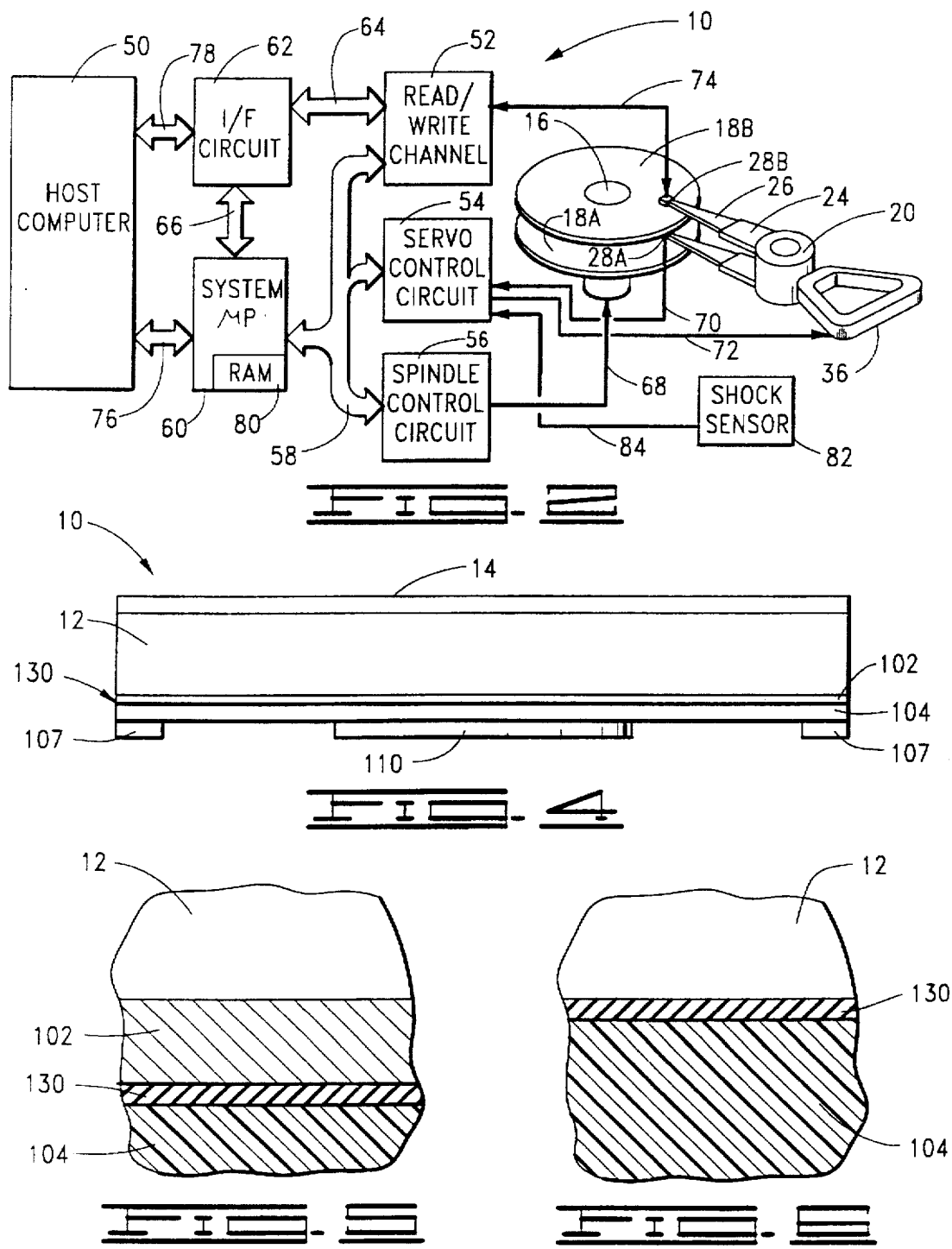

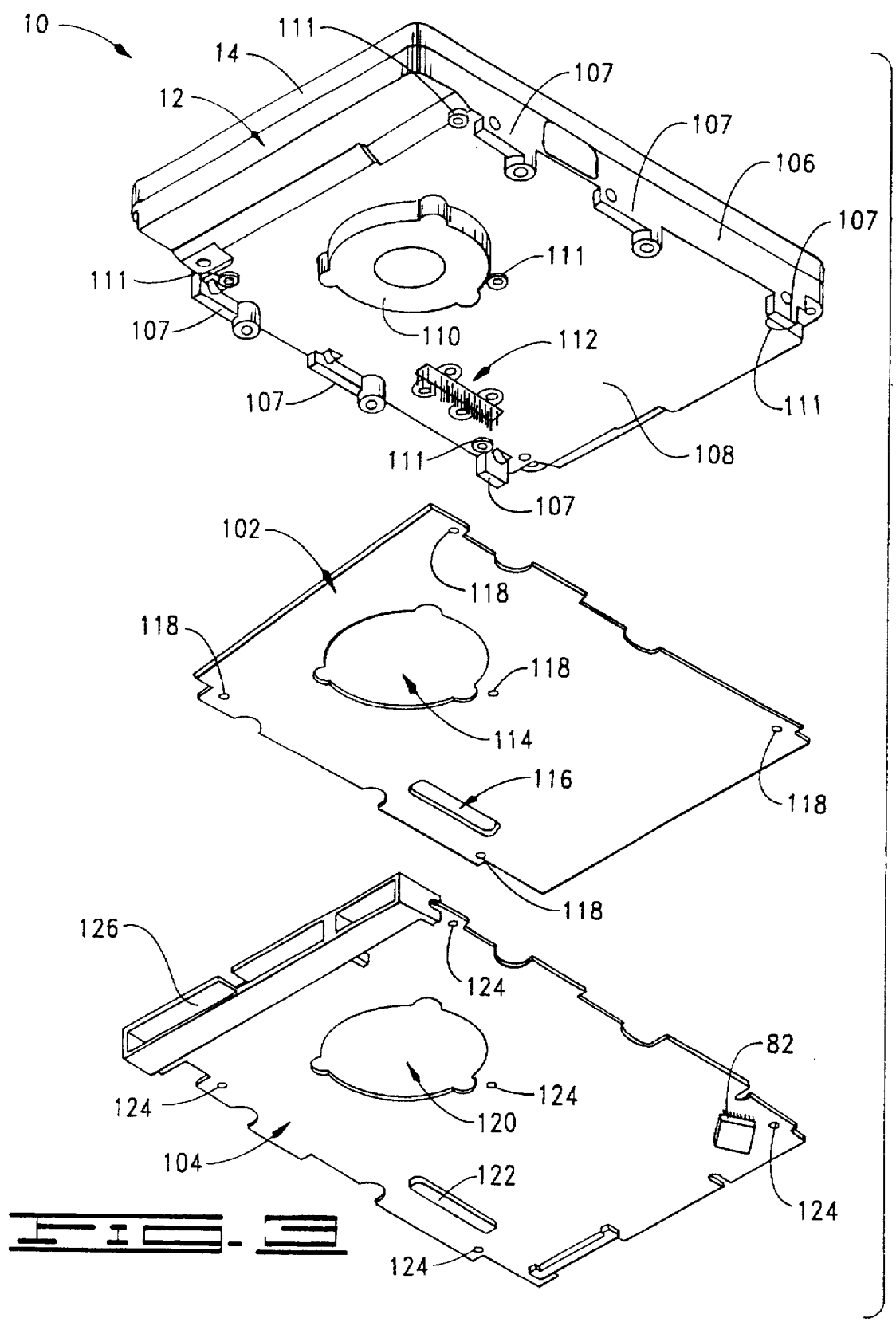

CONSTRAIN LAYER DAMPING OF A DISC DRIVE PRINTED WIRING ASSEMBLY

CROSS REFERENCE TO RELATED APPLICATIONS

This application claims the benefit of U.S. Provisional Patent Application Ser. No. 60/019,018, filed May 13, 1996.

BACKGROUND OF THE INVENTION

This invention relates generally to the field of disc drive data storage devices, and more particularly, but not by way of limitation, to reductions in acoustic emissions and improvements in disc drive shock sensor performance through the use of constrain layer damping.

Disc drives are commonly used in workstations, personal computers, portables and other computer systems to store large amounts of data in a form that can be made readily available to a user. A disc drive generally comprises one or more magnetic discs that are rotated by a spindle motor at a constant high speed. The surface of each disc is divided into a series of data tracks which are spaced radially from one another across a band having an inner diameter and an outer diameter. The data tracks extend generally circumferentially around the discs and store data in the form of magnetic flux transitions within the radial extent of the tracks on the disc surfaces. Typically, each data track in divided into a number of data sectors that store fixed sized data blocks.

A head includes an interactive element such as a magnetic transducer which senses the magnetic transitions on a selected data track to read the data stored on the track, or to transmit an electrical signal that induces magnetic transitions on the selected data track to write data to the track. The head includes a read/write gap that positions the active elements of the head at a position suitable for interaction with the magnetic transitions on the data tracks of a disc as the disc rotates.

As is known in the art, each head is mounted to a rotary actuator arm and is selectively positionable by the actuator arm over a preselected data track of the disc to either read data from or write data to the preselected data track. The head includes a slider assembly having an air bearing surface that causes the head to fly over the data tracks of the disc surface due to fluid air currents caused by rotation of the disc.

Typically, several discs are stacked on top of each other and the surfaces of the stacked discs are accessed by the heads mounted on a complementary stack of actuator arms which compose an actuator assembly. The actuator assembly generally includes head wires which conduct electrical signals from the heads to a flex circuit, which in turn conducts the electrical signals to a printed circuit board (PCB) mounted to a disc drive base deck.

As will be recognized, efforts are continually being made in the disc drive industry to increase the storage capacities and performance levels of modern disc drives while maintaining or reducing the physical sizes of the drives. Accordingly, increases in track densities and disc rotational speeds have made modern drives increasingly sensitive to external vibration inputs and self-excitation of rigid body vibration modes during operation.

In an effort to improve the reliability of disc drive read and write operations, electronic shock sensors are typically included on the disc drive PCBs to provide indications to the drives when shock events occur, allowing the drives to interrupt read and write operations when the drives are subjected to such mechanical shocks. However, should the mechanical configuration of a PCB be such that it can independently resonate with respect to the rest of the disc drive, resonances can be established and amplified in the PCB as a result of internally or externally generated excitations of the disc drive. In such a case, the shock sensor mounted to the PCB may falsely detect and report a shock event, when in fact the drive has not been subjected to sufficient vibration or shock to warrant an interruption of the drive operation.

Moreover, customer expectations continue to require reductions in the acoustic emissions of successive generations of drives. Present drive designs generally maximize the damping of the top side of the drives, so that most of the noise generated by a typical drive is emitted from the bottom side of the drive which has three major emission sources: the base deck, the PCB and the gap therebetween. Thus, efforts to minimize acoustic emissions have also included placing foam between the PCB and the base deck and by changing the number and locations of attachment screws used to secure the PCB relative to the base deck.

There is a need, therefore, for an improved disc drive design that serves to reduce bottom side acoustic emissions, as well as to eliminate the false triggering of a shock sensor mounted to a disc drive PCB by reducing PCB vibration modes.

BRIEF SUMMARY OF THE INVENTION

The present invention provides an apparatus for reducing mechanical resonances in a disc drive printed circuit board in order to reduce acoustic emissions and improve mechanical shock sensing and reporting.

In the practice of the preferred embodiment, a constrain layer comprising a thin layer of rigid, stiffening material is disposed adjacent to the exterior surface of the base portion of a base deck of the disc drive. A vibro-acoustic isolator comprising a thin layer of dampening material is disposed adjacent the constrain layer. Fastener means are then used to fasten the printed circuit board, the vibro-acoustic isolator and the constrain layer to the base portion of the base deck.

The vibro-acoustic isolator serves to isolate the printed circuit board from the constrain layer and at the same time dampen mechanical resonances established in the printed circuit board, in conjunction with the stiffening provided by the constrain layer. The constrain layer and vibro-acoustic isolator thus reduce acoustic emissions generated by resonances established in the printed circuit board, as well as reducing the potential for false triggering of a shock sensor mounted to the printed circuit board and used to detect shock events encountered by the disc drive.

In a preferred embodiment, the constrain layer comprises a sheet of stainless steel and the vibro-acoustic isolator comprises a layer of pressure sensitive adhesive. A second preferred embodiment comprises the use of the vibro-acoustic isolator without the constrain layer, relying upon the stiffness of the base deck to serve as the constrain layer in conjunction with the vibro-acoustic isolator.

Accordingly, an object of the present invention is to reduce the occurrence of mechanical resonances in a disc drive printed circuit board.

Another object is to reduce the level of acoustic noise emitted by the disc drive.

Yet another object is to reduce the occurrence of false indications of shock events as a result of vibrations of the printed circuit board.

Other objects, advantages and features of the present invention will be apparent from the following description when read in conjunction with the drawings and appended claims.

BRIEF DESCRIPTION OF THE SEVERAL VIEWS OF THE DRAWINGS

FIG. 1 is a top plan view of a disc drive in which the present invention is particularly useful.

FIG. 2 is a functional block diagram of the disc drive of FIG. 1.

FIG. 3 is a partially exploded view of the disc drive of FIG. 1, showing the preferred embodiment for the constrain layer of the present invention.

FIG. 4 is an elevational view of the disc drive of FIG. 1.

FIG. 5 is a partial cross-sectional view of a portion of FIG. 4.

FIG. 6 is a partial cross-sectional view of an alternative embodiment of the present invention.

DETAILED DESCRIPTION OF THE INVENTION

Turning now to the drawings and more particularly to FIG. 1, shown therein is a top plan view of a disc drive 10 which is constructed in accordance with the present invention. The disc drive 10 includes a base deck 12 to which various disc drive components are mounted and a top cover 14, which is shown in a partial cut-away fashion to expose selected components of interest. It will be readily understood that the base deck 12 includes an interior surface to which various disc drive components are mounted, as well as side walls which, in combination with the top cover 14, provide sufficient height to house these components within a sealed internal environment.

Mounted to the base deck 12 is a spindle motor (shown generally at 16) to which a plurality of discs 18 are mounted for rotation at a constant high speed. Adjacent the discs 18 is an actuator assembly 20 (also referred to as an "E-block") which pivots about a pivot shaft 22 in a rotary fashion. The actuator assembly 20 includes actuator arms 24 which extend radially from the actuator assembly 20 and support gimbal assemblies 26 (also referred to as "load springs"). The gimbal assemblies 26 in turn support heads 28, with each of the heads 28 corresponding to a surface of one of the discs 18. As provided hereinabove, the heads 28 are positionably located over data tracks (not shown) of the discs 18 in order to read data from and write data to the tracks, respectively. At such time that the disc drive 10 is not in use, the heads 28 are moved to landing zones (denoted at broken line 30), and latched by way of a latching arrangement 32 to secure the actuator assembly 20.

Continuing with FIG. 1, the actuator assembly 20 is controllably positioned by way of a voice coil motor (VCM, shown generally at 34), comprising an actuator coil 36 immersed in the magnetic field generated by a permanent magnet 38. It will be recognized that a magnetically permeable flux path (such as a steel plate) is mounted above the actuator coil 36 to complete the magnetic circuit of the VCM 34, but for purposes of illustration this flux path has not been shown in FIG. 1. When controlled DC current is passed through the actuator coil 36, an electromagnetic field is set up which interacts with the magnetic circuit of the VCM 34 to cause the actuator coil 36 to move relative to the permanent magnet 38. As the actuator coil 36 moves, the E-block 20 pivots about the pivot shaft 22, causing the heads 28 to move across the surfaces of the discs 18.

To provide the requisite electrical conduction paths between the heads 28 and disc drive read/write circuitry (not shown in FIG. 1), head wires (not separately shown) are routed on the E-block 20 from the heads 28, along the gimbal assemblies 26 and the actuator arms 24, to a flex circuit assembly 40. The head wires are secured by way of a suitable soldering process to corresponding pads of a flex circuit board 42 of the flex circuit assembly 40. In turn, the flex circuit board 42 is connected to a flex circuit bracket (shown generally at 44) in a conventional manner and communication is provided between the flex circuit bracket 44 and a printed circuit board (PCB) mounted to the underside of the disc drive 10. As will be recognized, the PCB houses the interface and control electronics for the disc drive 10.

Referring now to the FIG. 2, shown therein is a simplified functional block diagram of the disc drive 10 of FIG. 1, operably connected to a host computer 50. More particularly, FIG. 2 shows the disc drive 10 to generally comprise a read/write channel 52, a servo control circuit 54 and a spindle control circuit 56, all operably connected by way of control bus 58 to a system microprocessor 60. It will be recognized that the control bus 58 comprises the necessary connections for the system microprocessor 60 to communicate with and control these disc drive circuits. Additionally, an interface circuit 62 is shown connected to the read/write channel 52 (by way of an internal data bus 64) and to the system microprocessor 60 (by way of a control bus 66), with the interface circuit 62 serving as a data interface for the disc drive 10.

As will be recognized, the spindle control circuit 56 controls the rotational speed of the spindle motor 16 and discs 18A, 18B, as generally indicated by signal path 68. As the construction and operation of the spindle control circuit 56 are conventional, these will not be further discussed herein.

The servo control circuit 54 of FIG. 2 is shown to receive servo position information from a head 28A by way of signal path 70 and, in response thereto, provides a correction signal path 72 to the actuator coil 36 in order to position the heads 28A, 28B with respect to the discs 18A, 18B. The actuator coil 36 interacts with the permanent magnet 38 of the VCM 34 as described hereinabove. As will be recognized, in a dedicated servo system the head 28A would comprise a servo head, dedicated to providing generally continuous servo positioning information to the servo control circuit 54 with the corresponding surface of the disc 18A serving as a dedicated servo surface. In such a dedicated servo system, the remaining heads (28B being the only other head shown in FIG. 2) would comprise data heads and would be used to transfer data to and from the remaining discs during write and read operations, respectively.

Alternatively, it will be recognized that in an embedded servo system, each of the heads 28A, 28B would serve as both servo and data heads, with both servo information and data being stored on the tracks of the discs 18A, 18B. In an embedded servo system, functional connections would generally be provided from each of the heads 28A, 28B to the servo control circuit 54 as well as to the read/write channel 52. However, it will be recognized that the present invention does not depend on the use of a particular type of servo system. For more discussion regarding the construction and operation of a typical dedicated servo control circuit, see U.S. Pat. No. 5,262,907 entitled HARD DISC DRIVE WITH IMPROVED SERVO SYSTEM, issued Nov. 16, 1993 to Duffy et al., assigned to the assignee of the present invention and incorporated herein by reference.

Finally, the read/write channel 52 passes data to be written to and read from the disc 18B, respectively, by way of signal path 74 and the head 28B. That is, in response to a write command received by the system microprocessor 60 from the host computer 50 (by way of a command bus 76), the system microprocessor 60 controls the flow of data to be written to disc from the host computer 50 to the interface circuit 62 (by way of an external data bus 78) and from the interface circuit 62 to the read/write channel 52 (by way of the internal data bus 64). The read/write channel 52, in turn, provides a write current to the head 28B by way of the path 74 in order to write the data by selectively magnetizing selected data tracks on the disc 18B.

Likewise, in response to a read command from the host computer 50, the head 28B detects flux transitions from the selected data tracks on the disc 18B and provides an analog read signal to the read/write channel 52, which in turn converts the analog read signal to digital form and performs the necessary decoding operations to provide data to the interface circuit 62 for output to the host computer 50. In controlling these various operations of the disc drive, the system microprocessor 60 includes the use of programming stored in system microprocessor RAM 80.

Continuing with FIG. 2, a shock sensor (identified generally at 82) provides input signals to the servo control circuit 54 by way of path 84 in response to mechanical shock events sensed by the shock sensor 82. As will be recognized, the shock sensor 82 is mounted transversally on the PCB and operates as an accelerometer so that, when a mechanical vibration is established in the disc drive 10 (whether internally or externally generated), the shock sensor 82 will set a bit in a register (or other suitable memory location) indicative of the occurrence of the shock event. At each servo frame, the servo microprocessor (not shown) will check for such indications from the shock sensor 82 and in response, will cause a read or write fault to be declared, interrupting the reading or writing of data until the error is cleared. For reference, a suitable shock sensor is model ACH04-0-01, manufactured by Amp.

As discussed above, the use of the shock sensor 82 to detect mechanical shocks provides the benefit of preventing the reading or writing of data at times when the disc drive is subjected to a large mechanical shock. However, as drives become increasingly sensitive to mechanical shocks, the sensitivities of such sensors must also be increased so as to ensure reliable reading and writing of data with the use of increasingly sensitive sensors, though, the mechanical vibration modes of the PCB become increasingly important and can result in false shock indications from the sensors.

Accordingly, as shown in FIG. 3, the present invention includes the use of a constrain layer 102 which is disposed between the base deck 12 and a PCB 104 of the disc drive 10 in order to damp out PCB vibrations which generate acoustic noise and adversely affect the performance of the shock sensor 82. More particularly, FIG. 3 provides an exploded view of the base deck 12, constrain layer 102 and the PCB 104, with the constrain layer 102 being mounted on the base deck 12 in a manner to be described hereinbelow and the PCB 104, in turn, being mounted to the constrain layer 102. Selected features of each of these components will now be described.

Beginning with the base deck 12, as shown in FIG. 3, the base deck 12 includes side walls 106 and a base portion 108, with the top cover 14 mating with the top of the side walls 106 in a conventional manner. Additionally, the side walls 106 substantially provide the interior height of the sealed environment for the disc drive 10 and include standoffs 107 which facilitate the mounting of the disc drive 10 in the user environment. As will be recognized, the base deck 12 is preferably fabricated using a suitable casting process with secondary machining operations on selected surfaces as required.

The base portion 108 of the base deck 12 includes a spindle motor boss 110 which extends from the base portion 108 to accommodate selected internal components of the spindle motor 16. Threaded holes 111 are provided to secure the PCB 104 to the base deck 12 and electrical connector pins 112, which extend from the flex circuit bracket 44 of FIG. 1, provide the requisite electrical connections between the PCB 104 and the rest of the disc drive 10. It will be recognized that the base portion 108 can be provided with additional features, such as configured portions having slightly different elevations to accommodate the components internal to the disc drive 10; however, for clarity of illustration, such features have not been included in FIG. 3.

Next, as shown in FIG. 3 the constrain layer 102 comprises a generally rectangular plate having substantially the same size and shape as the base portion 108 of the base deck 12. The constrain layer 102 is preferably fabricated from a suitable material such as plastic or metal, depending on the stiffness requirements of a particular design as well as the potential effects upon the PCB 104 including electrical shorting, capacitance, shielding and thermal characteristics. However, in the preferred embodiment the constrain layer 102 formed from 10 mil thick stainless steel and is secured to and isolated from the PCB 104 by way of a vibro-acoustic isolator, which preferably comprises 2 mil thick layer of pressure sensitive adhesive (not shown in FIG. 3). The vibro-acoustic isolator will be discussed in greater detail hereinbelow.

The constrain layer 102 is provided with a central opening 114 and a connector opening 116 to accommodate the boss 110 and the connector pins 112, respectively, of the base deck 12. Through holes 118 are also provided and align with the threaded holes 111 of the base portion 108 of the base deck 12. Moreover, the sides of the constrain layer 102 are preferably configured to fit around the standoffs 107 of the base portion 108 of the base deck 12.

Finally, FIG. 3 shows the PCB 104 to include a central opening 120 sized to accommodate the boss 110 of the base portion 108 and a connector 122 which engages the connector pins 112 of the base portion 108 in a conventional manner. Although the PCB 104 houses the communication and control electronic components used by the disc drive 10 and discussed generally in FIG. 2, such components have not been shown in FIG. 3 for purposes of clarity, with the exception of the shock sensor 82, which as discussed above is mounted transversally in a corner of the PCB 104. The PCB 104 further includes through holes 124, which align with the through holes 118 of the constrain layer 102 and the threaded holes 111 of the base portion 108, so that fasteners (not shown) can be inserted through the PCB 104 and the constrain layer 102 to the base portion 108. The fasteners serve not only to facilitate the securing of the PCB 104 relative to the base deck 12, but also serve as grounding paths for the PCB 104. Finally, a PCB external connector 126 is provided at one end of the PCB 104, in order to provide power and communications from a host system (not shown) to the disc drive 10.

Having concluded a description of the respective features of the base deck 12, the constrain layer 102 and the PCB 104 of FIG. 3, the manner in which these components are integrated will now be discussed with reference to FIG. 4, which provides an elevational end view of the disc drive 10 of FIG. 1. More particularly, FIG. 4 shows the base deck 12 with the top cover 14 attached thereto, as well as the constrain layer 102 and the PCB 104. For purposes of clarity, the connector pins 112 of the base deck 12 and the connectors 122, 126 of the PCB 104 have been omitted from FIG. 4.

As discussed above, a vibro-acoustic isolator 130 is applied to the constrain layer 102 and sandwiched between the constrain layer 102 and the PCB 104 in order to provide improved mechanical dampening of the PCB 104 relative to the base deck 12. Once the vibro-acoustic isolator 130 is so located, the aforementioned fasteners are then used to secure the PCB 104, the vibro-acoustic isolator 130 and the constrain layer 102 to the base deck 12. For reference, FIG. 5 provides a more detailed view of the disc drive 10 of FIG. 4.

It will be recognized that the dampening effects of the isolator 130 in combination with the stiffening effects provided by the constrain layer 102 provide improved dampening of the PCB 104 and eliminating or greatly reducing PCB vibration modes that contribute to false triggering of the shock sensor 82 shown in FIG. 3. Additional benefits can be obtained such as improved shielding and ground integrity with the use of an electrically conductive material in the constrain layer 102. The vibro-acoustic isolator 130 can comprise any suitable dampening material, including thin layers of rubber or plastic, depending upon the vibration modes of the PCB 104. However, pressure sensitive adhesive, such as ISD 112, manufactured by 3M, has been found to be effective in combination with the constrain layer 102 fabricated from stainless steel.

Finally, although the preferred embodiment comprises the use of the constrain layer 102, it will be recognized that in some applications the base deck 12 will provide sufficient stiffness so that the PCB 104 can be attached directly to the base deck 12, sandwiching the layer of pressure sensitive adhesive therebetween. This alternative configuration is shown in FIG. 6.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive assembly of the type having a rotatable disc and a controllably positionable actuator adjacent the disc, the actuator including a head for reading and writing data from and to the disc, respectively, the disc drive further having a printed circuit board housing communications and control electronics used by the disc drive assembly, the disc drive further having a base deck having a base portion and side walls extending from the base portion, the base portion having an interior surface and an exterior surface, wherein the disc and actuator are mounted to the interior surface of the base portion, the improvement comprising:

a constrain layer disposed adjacent the base portion, the constrain layer comprising a sheet of stiff material having dimensions substantially that of the exterior surface of the base portion, the constrain layer having a first surface disposed in proximity to the exterior surface of the base portion; and a vibro-acoustic isolator, disposed adjacent a second surface of the constrain layer opposite the first surface, the vibro-acoustic isolator comprising a layer of dampening material substantially covering the first surface; wherein the constrain layer and the vibro-acoustic isolator are disposed between the printed circuit board and the exterior surface of the base portion and compressed therebetween by way of fastener means; and wherein the constrain layer and the vibro-acoustic isolator serve to dampen vibration modes of the printed circuit board and to reduce acoustic emissions generated by the printed circuit board during operation of the disc drive assembly.

2. The improvement of claim 1, wherein the constrain layer comprises a sheet of stainless steel formed to have length and width dimensions substantially those of the printed circuit board.

3. The improvement of claim 1, wherein the vibro-acoustic isolator further comprises a layer of pressure sensitive adhesive.

4. A disc drive, comprising:

a base deck having sidewalls and a base portion;

a top cover engageable with the base deck to form an internal sealed environment for the disc drive;

a printed circuit board housing control electronics for the disc drive;

damping means for damping vibration modes of the printed circuit board, the damping means comprising:
rigid strengthening means for strengthening the printed circuit board, the strengthening means comprising a sheet of stiffening material having dimensions substantially that of the base portion and the printed circuit board; and
isolation means, adjacent the strengthening means, for electrically isolating and mechanically dampening the printed circuit board, the isolation means having dimensions substantially that of the strengthening means; and attachment means for attaching the printed circuit board and the dampening means to the base portion of the disc drive, wherein the dampening means is disposed between the printed circuit board and the base portion of the disc drive, the dampening means dampening mechanical resonances in the printed circuit board.

5. The disc drive of claim 4, wherein the strengthening means comprises a layer of stainless steel.

6. The disc drive of claim 4, wherein the isolation means comprises a layer of pressure sensitive adhesive.

7. The disc drive of claim 4, further comprising a shock sensor mounted to the printed circuit board, the shock sensor providing indications when mechanical shock events are encountered by the disc drive, and wherein the dampening means operates to dampen mechanical resonances in the printed circuit board which cause false indications of the occurrence of mechanical shock events.

8. A disc drive having improved dampening characteristics and reduced acoustic noise emissions, comprising:

a base deck having sidewalls and a base portion;

a rotatable disc mounted to the base deck;

a rotary actuator adjacent the disc and mounted to the base deck, the rotary actuator including read/write heads for reading and writing data to the disc;

a top cover engageable with the base deck to form an internal sealed environment for the disc drive;

a printed circuit board housing control electronics for the disc drive;

a constrain layer disposed adjacent to and having substantially the same shape as the base portion of the base deck, the constrain layer comprising a sheet of rigid material;

a vibro-acoustic isolator disposed adjacent the constrain layer, the vibro-acoustic isolator comprising a layer of dampening material; and fastener means for fastening the printed circuit board, the constrain layer and the vibro-acoustic isolator to the base deck, wherein the constrain layer and the vibro-acoustic isolator are disposed between the base portion of the base deck and the printed circuit board, wherein the constrain layer and the vibro-acoustic isolator damp mechanical resonances in the printed circuit board.

9. The disc drive of claim 8, wherein the constrain layer further comprises a sheet of stainless steel.

10. The disc drive of claim 8, wherein the vibro-acoustic isolator further comprises a layer of pressure sensitive adhesive.

* * * * *

UNITED STATES PATENT AND TRADEMARK OFFICE
CERTIFICATE OF CORRECTION

PATENT NO. : 5,757,580
DATED : May 26, 1998
INVENTOR(S) : Andress & Pottebaum

It is certified that error appears in the above-identified patent and that said Letters Patent is hereby corrected as shown below:

Column 8, lines 7-8, delete "ther-ebetween" and insert --there-between--.

Signed and Sealed this

Twentieth Day of July, 1999

Attest:

Q. TODD DICKINSON

Attesting Officer

Acting Commissioner of Patents and Trademarks